United States Patent [19]

Amatucci et al.

[11] Patent Number: 5,587,133
[45] Date of Patent: Dec. 24, 1996

[54] DELITHIATED COBALT OXIDE AND NICKEL OXIDE PHASES AND METHOD OF PREPARING SAME

[75] Inventors: Glenn G. Amatucci, Raritan; Jean-Marie Tarascon, Martinsville, both of N.J.

[73] Assignee: Bell Communications Research, Inc., Morristown, N.J.

[21] Appl. No.: 383,401

[22] Filed: Feb. 3, 1995

[51] Int. Cl.$^6$ ............... C01D 1/02; C01G 49/02; C01G 51/04
[52] U.S. Cl. ............ 423/138; 423/592; 423/179.5; 423/594; 429/49; 429/50; 429/52; 429/218; 205/538; 205/548
[58] Field of Search ............... 429/49, 50, 52, 429/218; 204/140, 141.5; 423/138, 592, 179.5, 594; 205/538, 548

[56] References Cited

U.S. PATENT DOCUMENTS

| | | | |
|---|---|---|---|
| 4,818,647 | 4/1989 | Plichta et al. | 429/218 |
| 5,011,748 | 4/1991 | Shacklette et al. | 429/218 |
| 5,192,629 | 3/1993 | Guyomard et al. | 429/197 |
| 5,264,201 | 11/1993 | Dahn et al. | 423/594 |
| 5,296,318 | 3/1994 | Gozdz et al. | 429/192 |
| 5,296,319 | 3/1994 | Bito et al. | 429/218 |
| 5,401,599 | 3/1995 | Tahara et al. | 429/218 |

OTHER PUBLICATIONS

Ohzuku et al., J. Electrochem. Soc., vol. 141, No. 11, Nov. 1994, pp. 2972–2977.

Ohzuku et al., J. Electrochem. Soc., vol. 140, No. 7, Jul. 1993, pp. 1862–1870.

*Primary Examiner*—Kathryn Gorgos
*Attorney, Agent, or Firm*—Lionel N. White

[57] ABSTRACT

$LiCoO_2$ and $LiNiO_2$ are fully delithiated electrochemically using solid state electrolytic cells and oxidation resistant electrolytes to yield new phases of $CoO_2$ and $NiO_2$.

10 Claims, 10 Drawing Sheets

DELITHIATED COBALT OXIDE AND NICKEL OXIDE PHASES AND METHOD OF PREPARING SAME

BACKGROUND OF THE INVENTION

The increasing commercial importance of rechargeable lithium ion battery cells has prompted a desire to identify and to prepare cathode materials better able to reversibly intercalate and deintercalate lithium ions at greater voltages. There are three prominent reversible lithium intercalation compounds used for lithium ion rechargeable batteries: lithium cobalt oxide ($LiCoO_2$) and lithium nickel oxide ($LiNiO_2$) compounds, as well as lithium magnesese oxide ($LiMn_2O_4$) spinel.

$LiCoO_2$ cells are of particular interest because of their ability to insert/deinsert lithium reversibly at voltages greater than 4 V resulting in batteries that have an output voltage and an energy density 3 times greater than Ni—Cd. The theoretical charge capacity of $LiCoO_2$ cells is large at about 275 Amp-hours/kilogram (A-h/kg). In practical application, however, the maximum obtainable capacity for $LiCoO_2$ cells has been only about 140 A-h/kg, corresponding to a maximum charge voltage of about 4.2 V.

Previous attempts to exceed this charge cutoff voltage in $LiCoO_2$ cells have caused poor cell performance manifested by severe loss of charge capacity in subsequent charge-discharge cycles. The commonly-held reason for the 4.2 volt charge limitation for $LiCoO_2$ cells was that electrochemical delithiation of $LiCoO_2$ above this voltage destabilized the structure of the partially delithiated $LiCoO_2$ phase, impairing intercalation of lithium in subsequent charge-discharge cycles.

Lithium cobalt oxide adopts a hexagonal structure consisting of $CoO_2$ layers separated by a Van der Waals gap. The octahedral sites within the Van der Waals gap are occupied by the $Li^+$ ions. This results in the reversible intercalation of lithium.

In such compounds, lithium acts as a glue or cement, screening the repulsive interactions between the negatively charged $CoO_2$ layers. When the compound is fully lithiated $LiCoO_2$, the screening effect is greatest. As lithium is removed, the screening effect is decreased and the repulsions between the two $CoO_2$ layers are enhanced resulting in an expansion of the c-axis parameter. Due to the screening effect of lithium, it was believed that complete lithium deintercalation to form $CoO_2$ was not possible.

Ohzuku et al., *J. Electrochem. Soc.*, Vol. 141, No. 11, Nov. 1994, p. 2972, have succeeded in removing approximately 85% of the lithium. Their efforts revealed a monoclinic phase and questioned the existence of a $CoO_2$ phase.

In another theory, Reimers and Dahn, *J. Electrochem. Soc.*, 139, 2091, (1992), states that excess $Co^{4+}$ destroys the crystallinity of the lithium cobalt oxide structure. Apparently, it inhibits the formation of highly crystalline phases at low lithium contents.

Wizansky, Rauch, and DiSalvo, *Journal of Solid State Chemistry*, 81, 203–207 (1989), investigated the delithiation of $LiCOO_2$ through the use of powerful oxidizing agents such as $NO_2^+$ and $MoF_6$. Their results showed that this approach merely decomposes the $LiCoO_2$.

$LiNiO_2$ is isostructural with $LiCoO_2$ and is commercially viable for use in secondary lithium ion batteries. Heretofore, no one has been capable of obtaining the delithiated $NiO_2$ phase. Ohzuku et al., *J. Electrochem. Soc.*, Vol. 140, No. 7, July 1993, working with the nickel oxide reported $Li_{0.06}NiO_2$ and approximated that this was the end phase.

Lithium secondary batteries are generally recognized and are described for instance in U.S. Pat. No. 5,296,318 to Gozdz et. al., which is incorporated in its entirety herein by reference. Lithium metal-free "rocking-chair" batteries may thus be viewed as comprising two lithium-ion-absorbing electrode "sponges" separated by a lithium-ion-conducting electrolyte, usually comprising a $Li^+$ salt dissolved in a non-aqueous solvent or mixture of such solvents. Numerous such salts and solvents are known in the arts, as evidence in Canadian Pat. Publication No. 2,022,191, dated 30 Jan. 1991.

When cells comprising these previously-available electrolytes are cycled to a voltage even slightly greater than 4.3 V, electrolyte oxidation occurs. Although small, this oxidation can jeopardize the capacity, cycle life, and safety of the battery cell. For example, the electrode oxidation reaction consumes part of the charging current, which cannot be recovered when discharging the cell. The result is a continuous loss in the cell capacity over subsequent cycles. Further, if during each charge a small part of the electrolyte is consumed, excess electrolyte must be included when the cell is assembled. The excess electrolyte reduces the amount of active material for a constant volume battery body, thereby decreasing initial capacity. In addition, the oxidation of the electrolyte often generates solid and gaseous by-products. The solid by-products build up a passivating layer on the particles of the active material, essentially increasing the polarization of the cell and lowering the output voltage. Simultaneously, and more importantly, the gaseous by-products increase the internal pressure of the cell, thereby increasing the risk of explosion and leading to unsafe and unacceptable operating conditions.

U.S. Pat. No. 5,192,629, which is herein incorporated by reference in its entirety, provides a class of electrolyte compositions that are exceptionally useful for minimizing electrolyte decomposition in secondary batteries comprising strongly oxidizing positive electrode materials. These electrolytes are thus uniquely capable of enhancing the cycle life and improving the temperature performance of practical "rocking chair" cells. These electrolyte compositions have a range of effective stability extending up to about 5.0 V at 55° C., as well as at room temperature (about 25° C.).

Electrolytes that are substantially inert to oxidation include a 0.5M to 2M solution of $LiPF_6$, or $LiPF_6$ with up to about an equal amount of $LiBF_4$ added, in a mixture of dimethylcarbonate (DMC) and ethylene carbonate (EC) within the weight percent ratio range from about 95 DMC:5 EC to 20 DMC:80 EC. In a preferred electrolyte solution, the solvent ratio range is about 80 DMC:20 EC to 20 DMC:80 EC. An optimum composition for operation at room temperature and below is an approximately 1.5M $LiPF_6$ solution in a solvent mixture of about 67 DMC:33 EC. A battery operating at room temperature and higher, e.g., in the range of 55° C., optimally utilizes an electrolyte consisting essentially of an approximately 1.5M $LiPF_6$ solution in a solvent combination of about 33 DMC:67 EC. An additionally useful electrolyte consists essentially of an approximately 1M to 2M solution of equal pares of $LiPF_6$ and $LiBF_4$ in a solvent mixture of about 50 DMC:50 EC.

Negligible current increases, after the reversible Li intercalations, at voltages up to about 5 V vs. Li indicates this remarkable stability that enables enhanced cell capacity not only in the "rocking chair" cells comprising negative electrodes of carbon, e.g., petroleum coke, but also in Li negative electrode cells. Such a lithium metal cell utilizing a $LiCoO_2$ positive electrode may be reasonably expected to achieve normal operating ranges of about 4.3 to 5.1 V.

With the aid of electrolytes which are substantially inert to oxidation and solid state electrolytic cells, fully delithiated phases of both $CoO_2$ and $NiO_2$ were obtained.

SUMMARY OF THE INVENTION

Accordingly, the present invention is directed to metastable $CoO_2$ and $NiO_2$ phases and their use as intercalation compounds for use in lithium ion secondary batteries. Features and advantages of this invention are set forth in the description that follows, and they will be apparent from that description or can be learned by practice of the invention.

In one aspect, this invention relates to an electrochemical method for preparing a stable cobalt dioxide phase that includes preparing an electrolytic cell having an anode, an electrolyte substantially inert to oxidation, and a cathode including a lithium cobalt oxide intercalation complex; and applying a voltage to the cell sufficient to completely deintercalate lithium from the lithium cobalt oxide intercalation complex, thereby forming a stable cobalt dioxide phase in the cathode.

In a further aspect, this invention relates to a stable cobalt dioxide phase prepared by the foregoing method.

In a further aspect, this invention relates to a stable cobalt dioxide phase having the x-ray diffraction pattern:

| d(Å) |
|---|
| 4.30 ± 0.02 |
| 2.44 ± 0.02 |
| 2.12 ± 0.02 |
| 1.61 ± 0.02 |
| 1.41 ± 0.02 |
| 1.34 ± 0.02 |
| 1.17 ± 0.02 |

In a further aspect, this invention relates to an electrochemical method for preparing a stable nickel dioxide phase that includes providing a lithium nickel oxide intercalation complex having the formula $Li_xNiO_2$ wherein x is preferably 0.8 to 1.0, preparing an electrolytic cell having a cathode including the lithium nickel oxide intercalation complex, and applying a voltage to the cell sufficient to delithiate completely the lithium nickel oxide intercalation complex.

In a further aspect, this invention relates to a stable nickel dioxide phase prepared by the above described process. In a further aspect, this invention relates to a stable nickel dioxide phase having the x-ray diffraction pattern:

| d(Å) |
|---|
| 4.47 ± 0.02 |
| 2.40 ± 0.02 |
| 2.29 ± 0.02 |
| 1.97 ± 0.02 |
| 1.51 ± 0.02 |
| 1.41 ± 0.02 |
| 1.38 ± 0.02 |

In a further aspect, the invention relates to the a method of making a secondary electrolytic cell including the stable $CoO_2$ or $NiO_2$ phase and the cell formed thereby.

The accompanying drawings, which are incorporated in and constitute a part of this specification, illustrate embodiments of the invention and with the description serve to explain the invention and its objects, advantages, and principles.

BRIEF DESCRIPTION OF THE DRAWING

The present invention will be described with reference to the accompanying drawing of which.

DESCRIPTION OF THE INVENTION

One hindrance to the achievement of the $CoO_2$ and $NiO_2$ phases of the present invention, was removed by the development of electrolytes that are stable (inert to oxidation) at the high voltages thought necessary to achieve the delithiated $CoO_2$ phase. These electrolytes are exemplified by those described in U.S. Pat. No. 5,192,629, the disclosure of which is incorporated herein by reference. Nonetheless, it was commonly held that the $CoO_2$ phase was unattainable because in the complete absence of lithium ions in the Van der Waals gap between the negatively-charged $CoO_2$ layers, the repulsive force between the layers would be too great and a completely delithiated $CoO_2$ phase would never be stable.

Using an electrolytic cell incorporating an $LiCoO_2$ cathode material described herein and a high voltage-stable electrolyte, the $CoO_2$ phase can be prepared by applying to the cell a charge voltage of 5.2 V, which will deintercalate substantially all the lithium from the $LiCoO_2$ cathode, forming the $CoO_2$ phase. The $CoO_2$ phase is metastable and decomposes above 200° C.

Similarly, in an electrolytic cell using a high voltage-stable electrolyte and a $LiNiO_2$ cathode, a substantially complete delithiation to a $NiO_2$ phase can be achieved by applying a charge voltage of 5.1 V.

Once obtained, the $CoO_2$ and $NiO_2$ phases of the present invention can be reintercalated with lithium, or by other ions such as hydrogen nuclei, sodium (Example 4), potassium, or rubidium. Reintercalation of lithium or other ionic species into the $CoO_2$ or $NiO_2$ phases can be accomplished by electrochemical insertion or by vapor phase transport at temperatures below 200° C. Vapor phase transport is described in a paper by Tarascon et al., "Synthesis and peculiar properties of $InMo_6S_{x-8}Se_x$ and $Hg_yMo_6S_{x-8}Se_x$", *Physical Review B*, Vol. 31, NO. 2, 1985, which is incorporated herein by reference in its entirety.

Following reintercalation, these phases can, for example, be cycled with lithium between 3 V and 4.2 V for the $CoO_2$ phase and 2.8 V and 4.1 V for the $NiO_2$ phase without loss of cell capacity.

Figure 11:
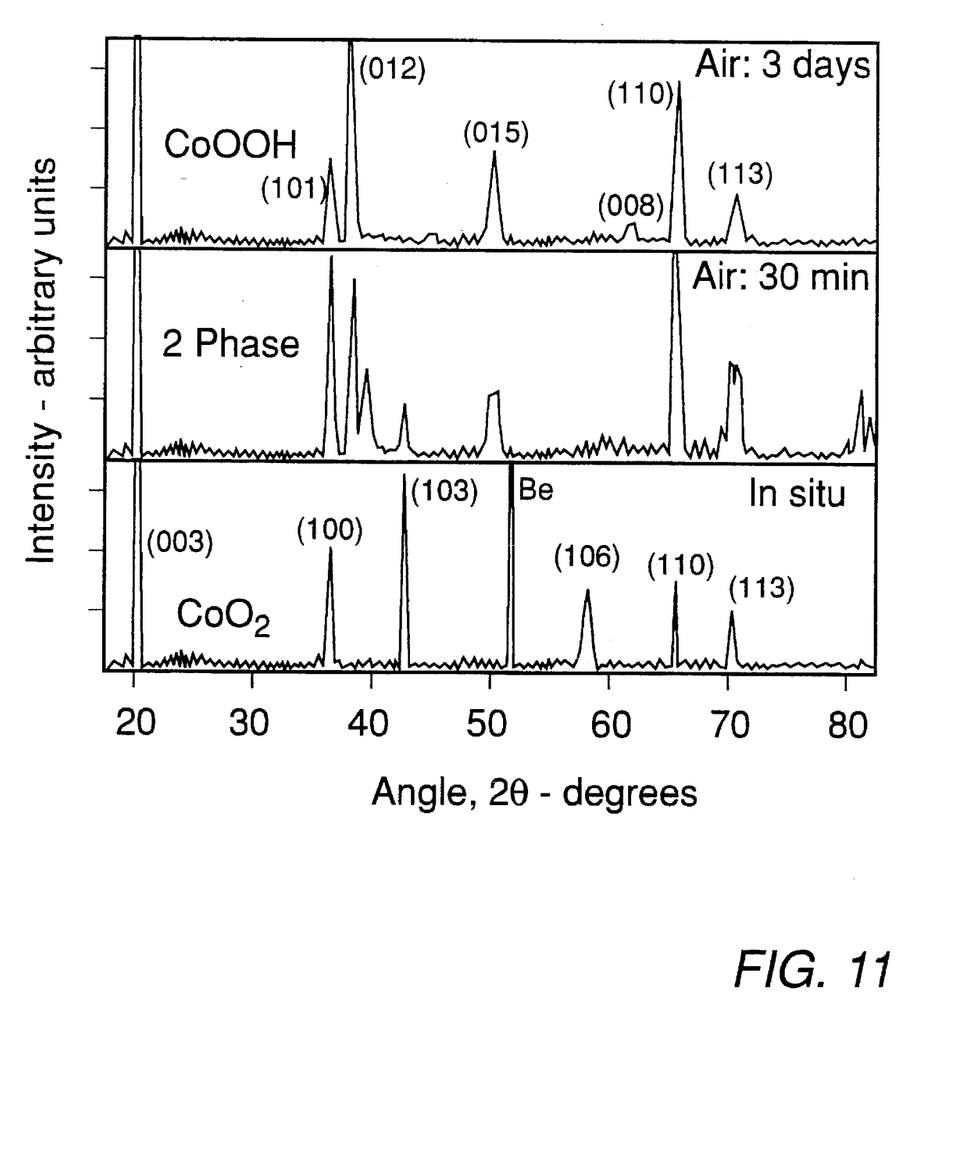
FIG. 11 is an x-ray diffraction diagram illustrating the effect of atmospheric water on the $CoO_2$ phase.

After formation of the $CoO_2$ phase, CoOOH may be formed by exposure of the phase to atmospheric water. As can be seen from FIG. 11, $CoO_2$ may be formed in situ in an electrochemical cell. After exposure to air for approximately 30 minutes, two phases are present. After 3 days in air CoOOH was formed, because at an open circuit voltage >4 V the following reaction occurs:

The CoOOH may be used as an electronic conductor in other battery technology. This includes application in the Ni electrode or NiMeH, Ni—H or Ni—Cd batteries in which cobalt is already used.

As an alternative, once formed, these phases can be used in any variety of manners. In one preferred embodiment, the cathode of a plastic solid state cell is not laminated to the underlying electrolyte/anode structure, thus allowing ease of removal of the $CoO_2$ or $NiO_2$ phase in a plastic matrix. This plasticized phase can then easily be transported to other environments. For the reasons discussed above, if the pure $CoO_2$ phase is desired, handling under inert (anhydrous) conditions is preferred.

In another embodiment, this plasticized phase is placed into a cell containing, for example, a sodium containing electrolyte and a compatible electrolyte and then the cobalt or nickel oxide phase is reintercalated with the sodium ions. This reintercalation may be stopped short of completion and, in that way, a second or subsequent ion may be added to the reintercalated metal oxide phase.

In yet another embodiment, the nickel or cobalt oxide phase may be combined with an organic component to form, for example, either a composite polymer or an activated metal oxide carrier. The redox potential of this phase is high making it potentially useful in many areas. Anticipated applications include, for example, forming inorganic polymer structures and as a biochemical carrier. Such applications would be clearly recognizable to the skilled artisan.

The following examples exemplify the practice of the present invention to the prior art. It will be appreciated by those skilled in the art that these examples are not to be construed as limiting the present invention.

EXAMPLE 1

A plastic electrolytic cell was constructed comprising a matrix of polyvinylidene fluoride (PVdF) and hexafluoropropylene (HFP) and incorporating an electrolyte composition of 2 parts EC to one part DMC and 1M $LiPF_6$, which was inert to oxidation at high voltages. The cathode contained $LiCoO_2$ as an active material and the anode contained carbon. The anode and the solid state electrolyte were laminated to one another and the cathode was placed thereover.

Figure 1:
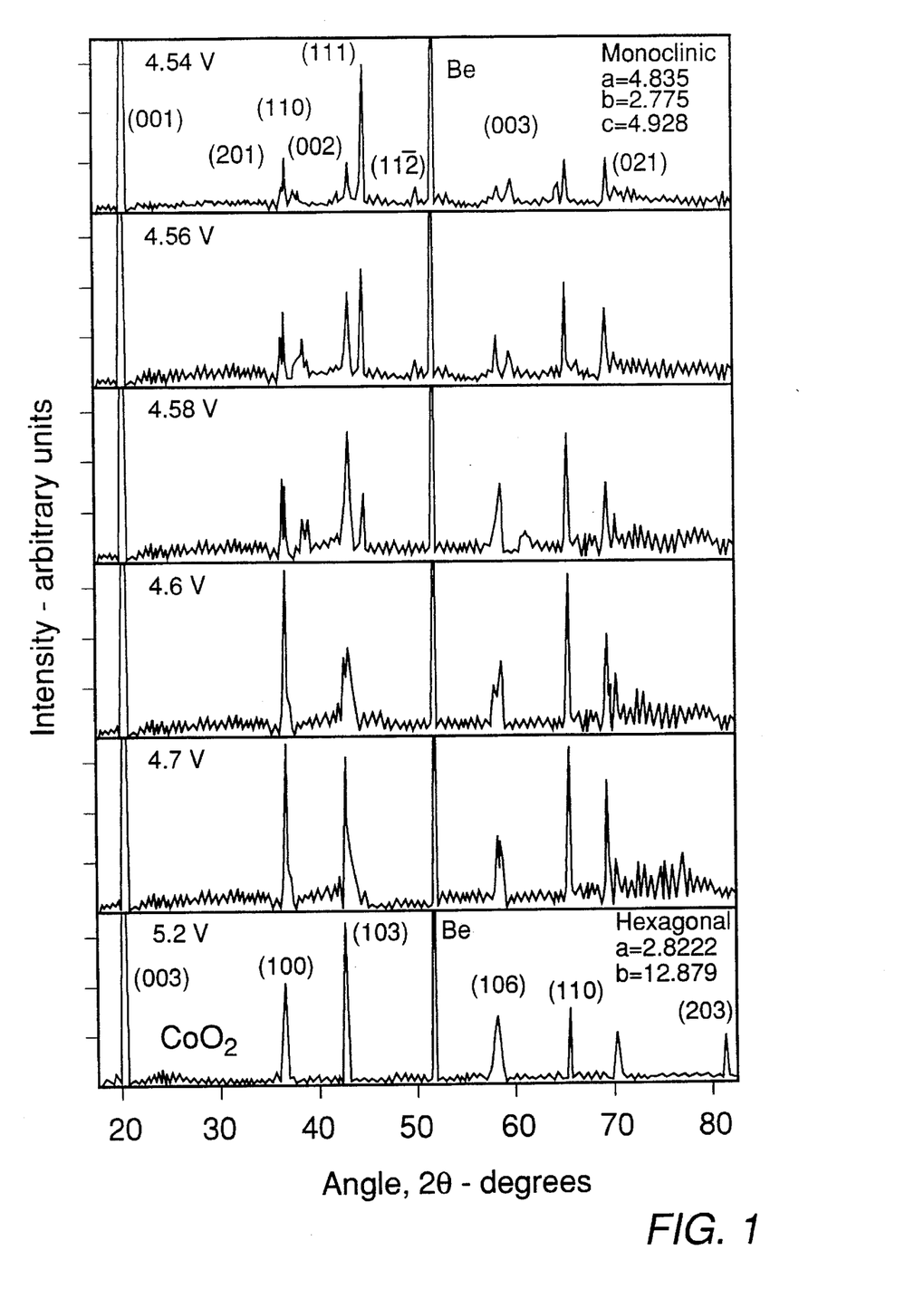
FIG. 1 is a series of x-ray diffraction diagrams taken during electrochemical delithiation of $LiCoO_2$ to form the $CoO_2$ phase.

This cell was charged to 5.2 V, at which point the $LiCoO_2$ was fully delithiate to form the $CoO_2$ phase. The existence of this phase is confirmed by the x-ray data depicted in FIG. 1. FIG. 1 depicts the diffraction pattern at the end of deintercalation of $LiCoO_2$ beginning at approximately the last known phase disclosed in the prior literature, i.e., monoclinic ($Li_{0.15}CoO_2$) and proceeding to complete delithiation at a voltage of 5.2 V.

The x-ray diffraction patterns were obtained in-situ through the use of an X-ray diffraction apparatus that allows the use of high voltages without corrosion of the beryllium window.

Figure 2:
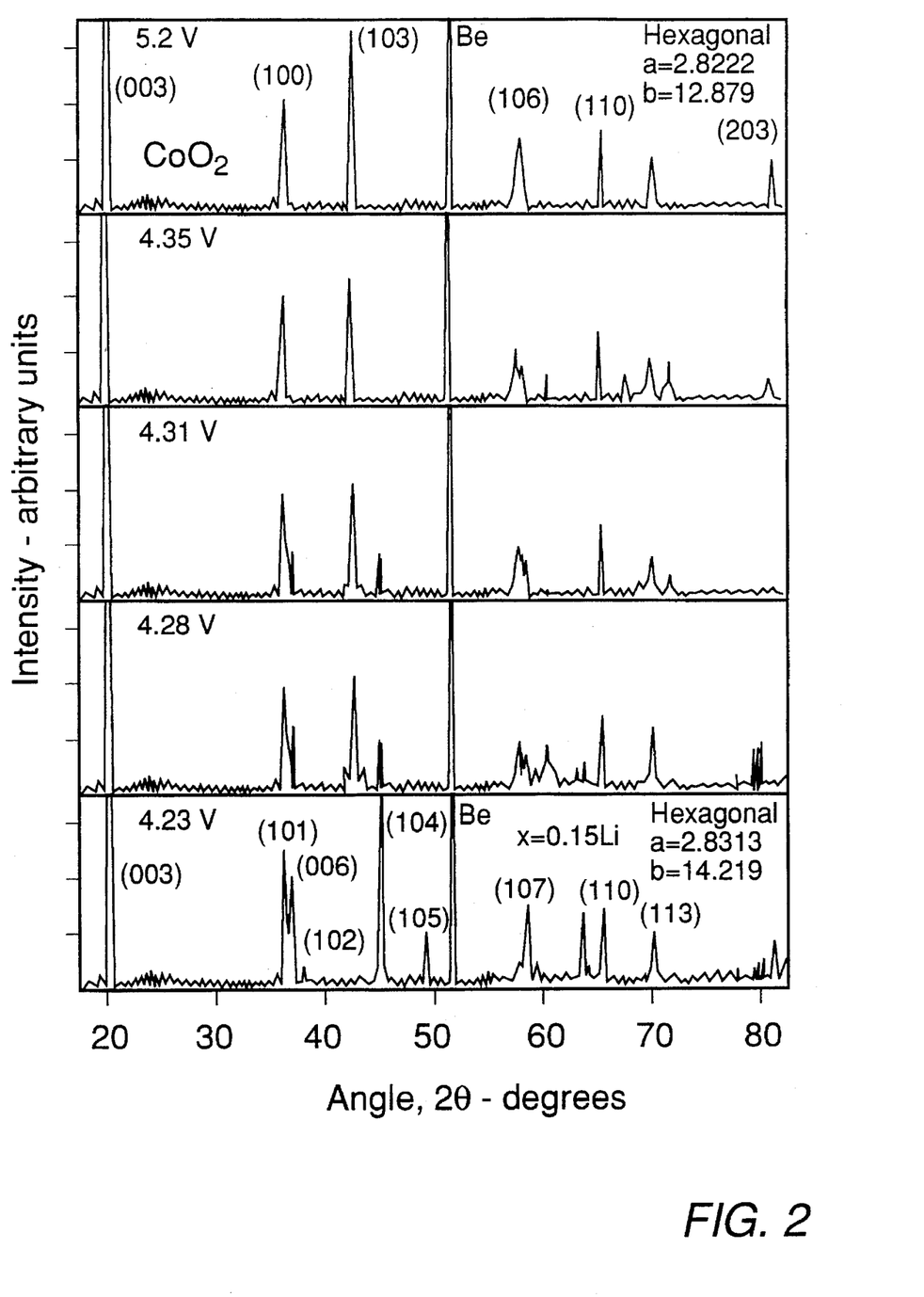
FIG. 2 is a series of x-ray diffraction diagrams taken during electrochemical intercalation of lithium into the $CoO_2$ phase.
Figure 3:
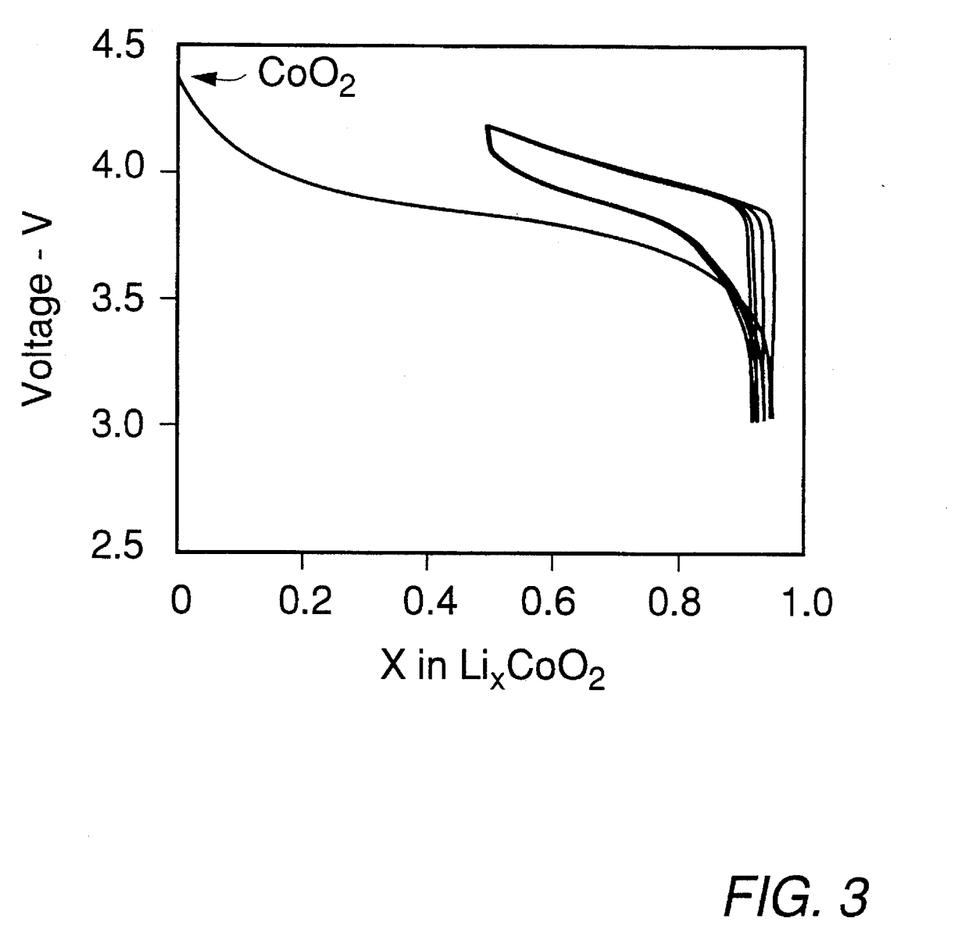
FIG. 3 plots charge and discharge voltage versus lithium content for a cell utilizing the $CoO_2$ phase.

The final x-ray diffraction pattern obtained at 5.2 V is the hexagonal structure associated with the $CoO_2$ phase. Moreover, once obtained, the $CoO_2$ phase reconverted to the $LiCoO_2$ phase during discharge of the cell as shown by the series of x-ray diffraction patterns in FIG. 2. Following attainment of the $CoO_2$ phase in the cathode and reintercalation of lithium to form the $LiCoO_2$ phase, this cell was cycled between 3 V and 4.2 V with little loss of charge capacity, as seen in FIG. 3.

During the charge cycle of a partially delithiated cobalt oxide, reinsertion of the lithium forms a monoclinic phase; however, reinsertion of lithium into the fully delithiated cobalt oxide resulted in a hexagonal structure, which is the same as the structure of the $LiCoO_2$ originally incorporated into the electrolytic cell.

EXAMPLE 2

Figure 10:
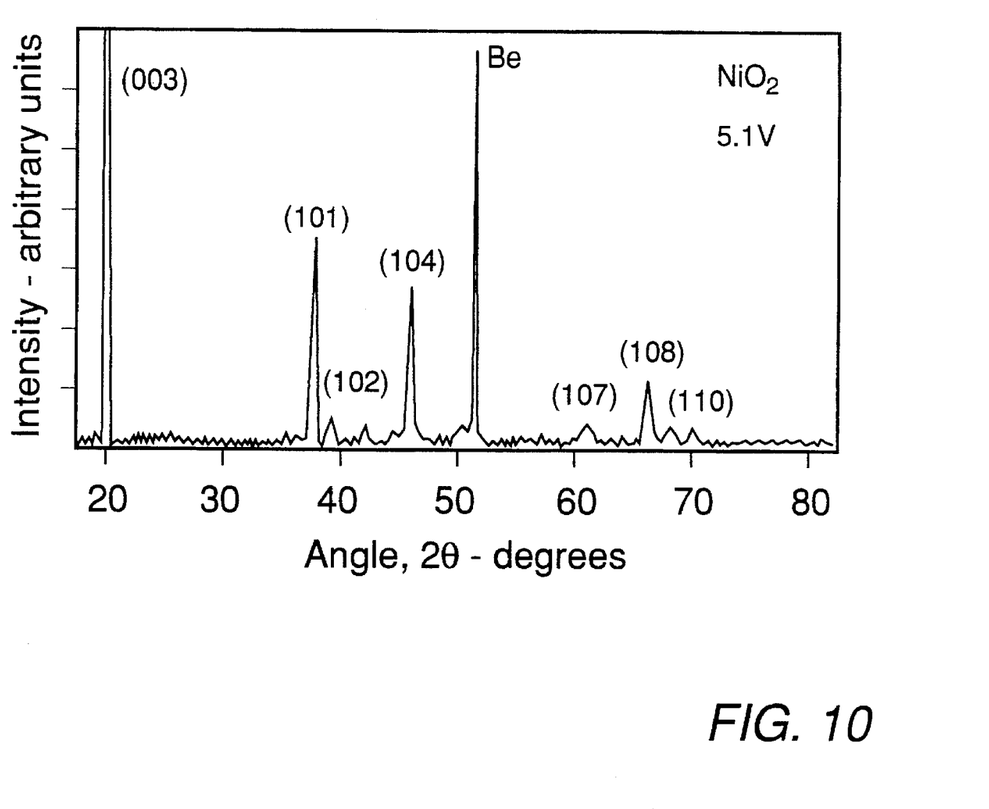
FIG. 10 is an x-ray diffraction diagram taken during electrochemical delithiation of $LiNiO_2$ to form the $NiO_2$ phase.

A plastic electrolytic cell was constructed as in Example 1, incorporating an electrolyte composition inert to oxidation at high voltages and a cathode made from $LiNiO_2$. This cell was charged to 5.1 V, at which voltage substantially all of the lithium was removed from the $LiNiO_2$ phase to form the $NiO_2$ phase. The existence of the $NiO_2$ phase is confirmed by the x-ray data depicted in FIG. 10.

Figure 4:
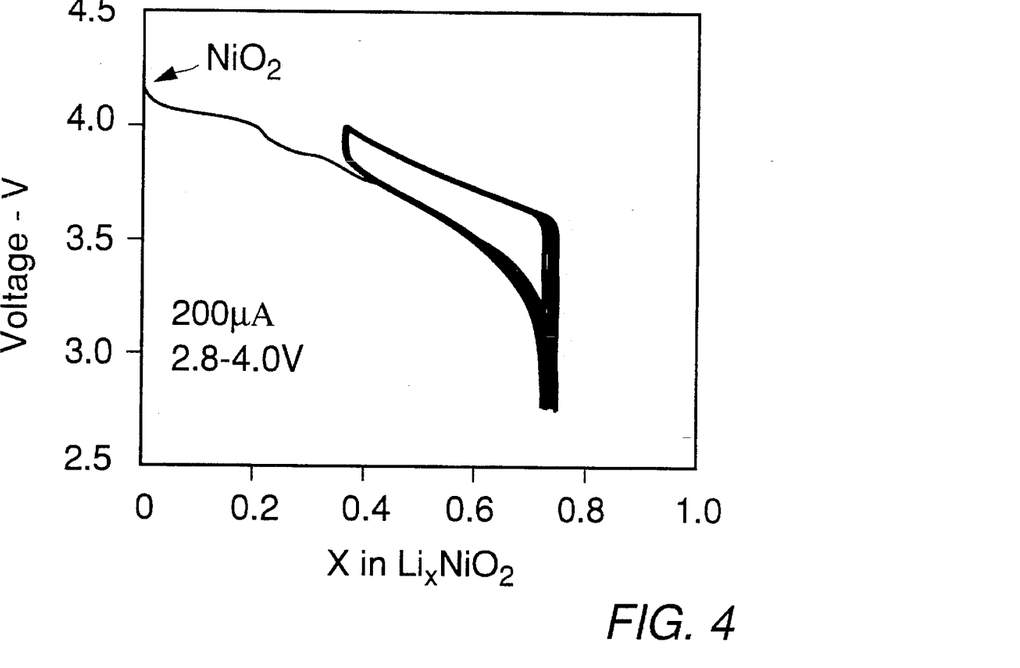
FIGS. 4 and 5 plot charge and discharge voltage versus lithium content for a cell having a $LiNiO_2$ cathode that has been delithiated to the $NiO_2$ phase according to the invention.
Figure 5:
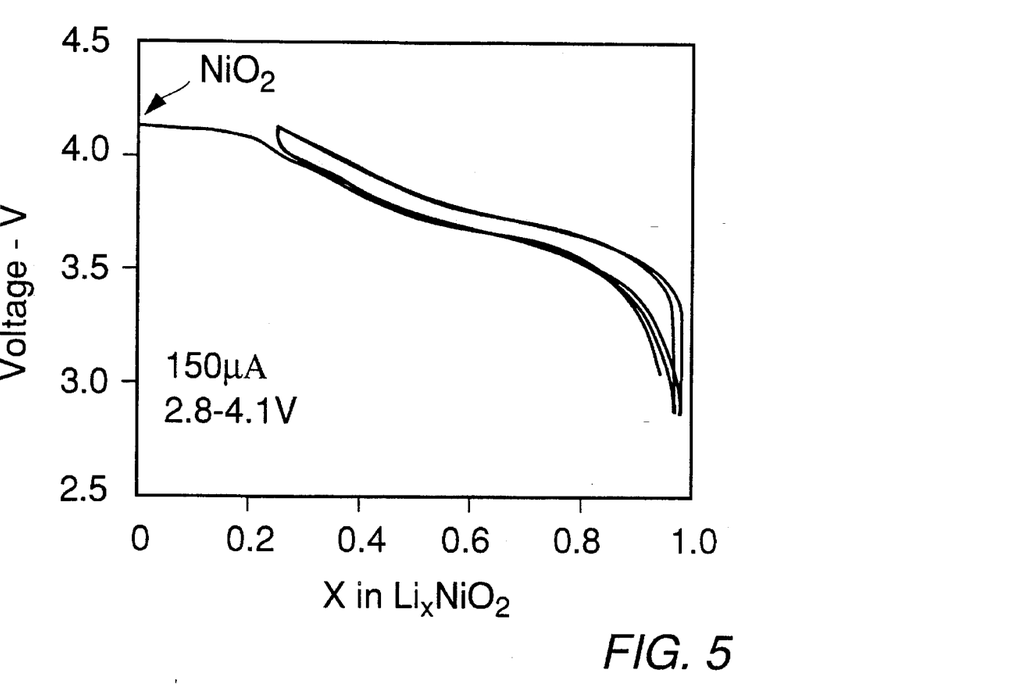

The cell was discharged at 200 µA, whereupon 70% of the lithium intercalated back into the $NiO_2$ structure, as seen in FIG. 4. Subsequent cycling this cell between 2.8 V and 4.0 V without capacity fading confirmed that the reversible charge characteristics of the $Li_xNiO_2$ were not destroyed by the attainment of the $NiO_2$ phase. Reducing the discharge current to 150 µA resulted in intercalation of all of the lithium to form the $LiNiO_2$ phase. As shown in FIG. 5, subsequent cycling of this cell between 2.8 V and 4.1 V resulted in a high capacity (greater than 190 A-h/kg) with minimal polarization and slight irreversibility characteristic of $LiNiO_2$. These results show that total removal of lithium from $LiNiO_2$ produces a structure that remains electrochemically active.

EXAMPLE 3

A study of the thermal stability of the $CoO_2$ phase and $NiO_2$ phase was undertaken. Plastic electrodes of $LiCoO_2$ and $LiNiO_2$ brought to the $CoO_2$ phase and the $NiO_2$ phase in the manners described in Examples 1 and 2, respectively, were dissolved separately in a dilute acetone solvent at room temperature. The plastic portions of the electrodes dissolved in the solvent, and the insoluble metal oxides settled to the bottom of the vessels. The metal oxides were separated from the solution and analyzed using differential scanning calerimetry (DSC) ramped to 300° C. at 10° C./min.

Figure 6:
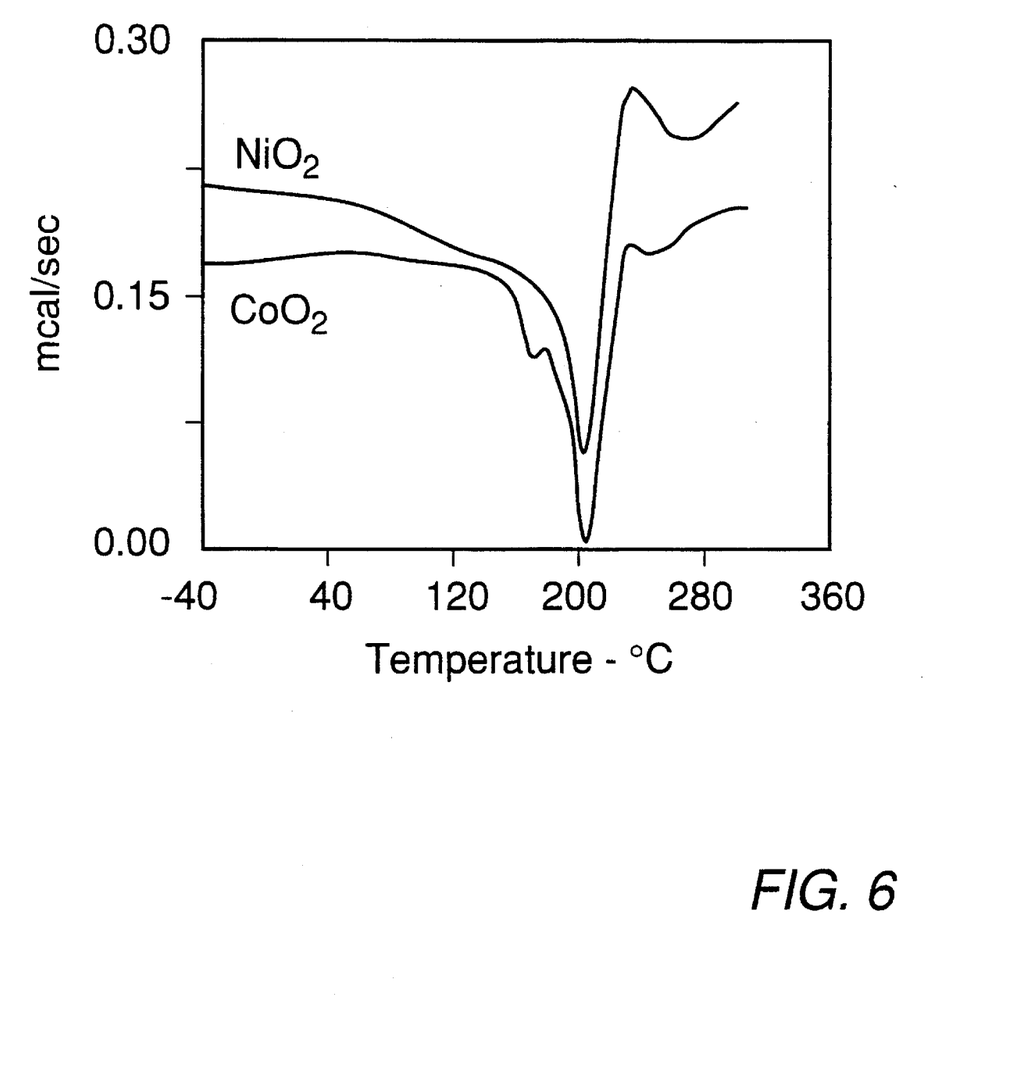
FIG. 6 plots decomposition reaction heat versus temperature for the $CoO_2$ and $NiO_2$ phase.
Figure 7:
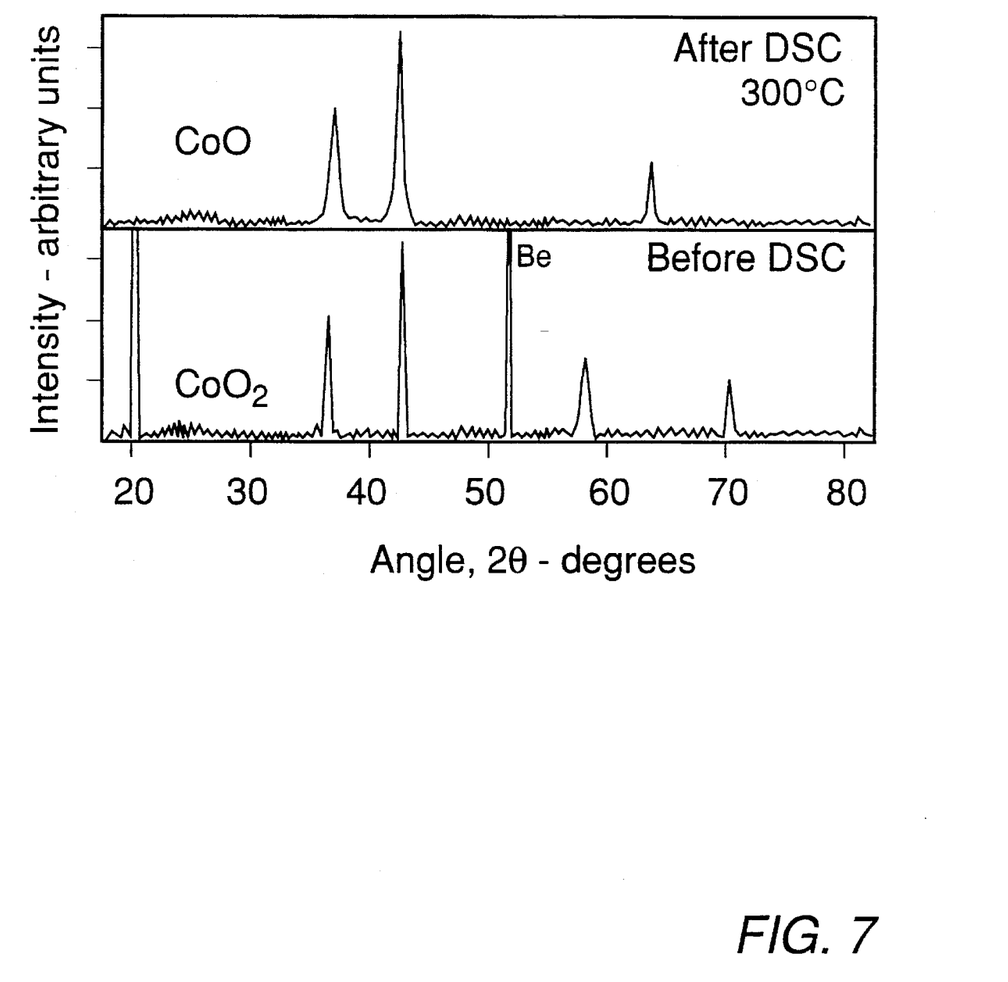
FIGS. 7 and 8 are x-ray diffraction diagrams for the thermal decomposition products of the $CoO_2$ and $NiO_2$ phases.
Figure 8:
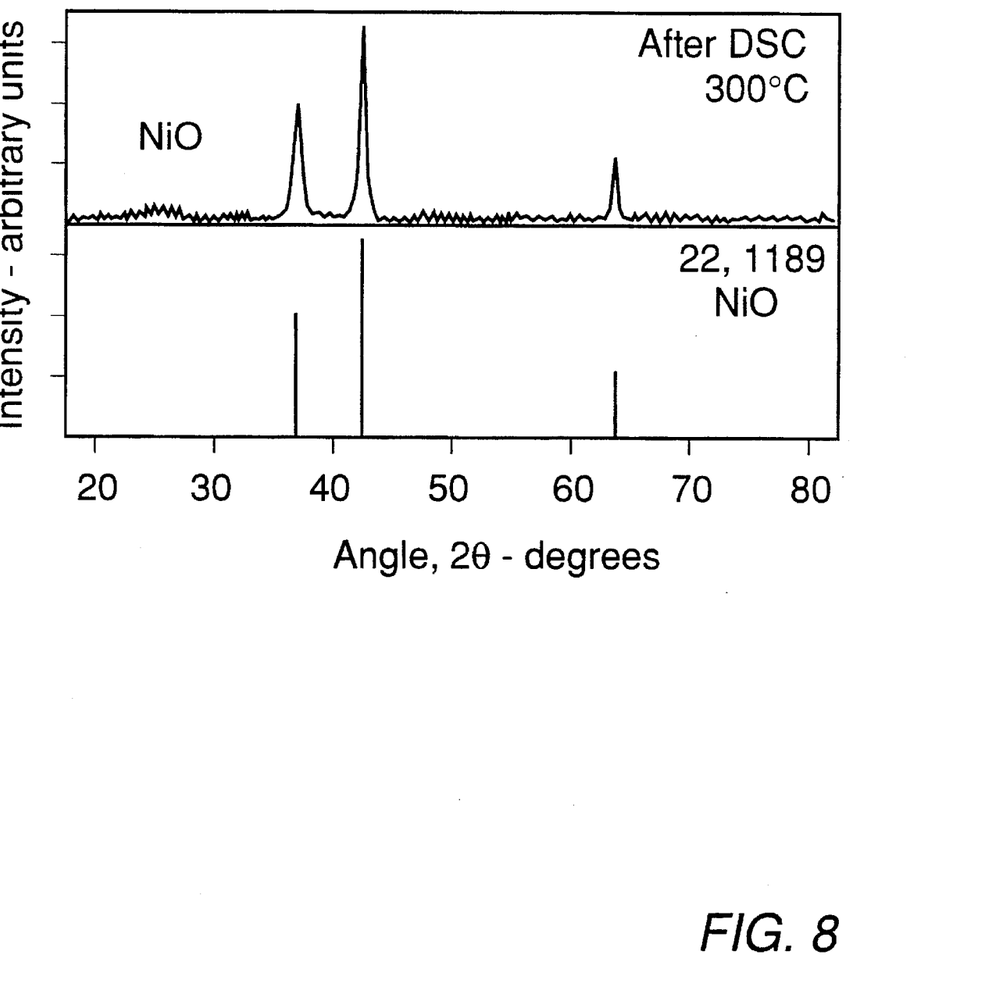

As seen in FIG. 6, a relatively strong exothermic reaction occurred at 200° C. for both the $CoO_2$ and $NiO_2$ phases. Analysis of the samples by x-ray diffraction after DSC revealed that both phases reduced with attendant oxygen loss according to the reaction $MO_2 \rightarrow MO + \frac{1}{2}O_2$ The x-ray diffraction patterns depicted in FIGS. 7 and 8 confirm that the samples transformed into the mixed rocksalt structures of CoO and NiO, which are known to be electrochemically inactive to lithium intercalation.

EXAMPLE 4

A cell was constructed as in Example 1. The $CoO_2$ phase was formed by delithiating the plastic cell at 5.2 V for 15 hours. After the $CoO_2$ phase was formed, the plasticized $CoO_2$ was removed from the electrolyte/anode structure and then incorporated into a similarly constructed cell contained sodium.

Figure 9:
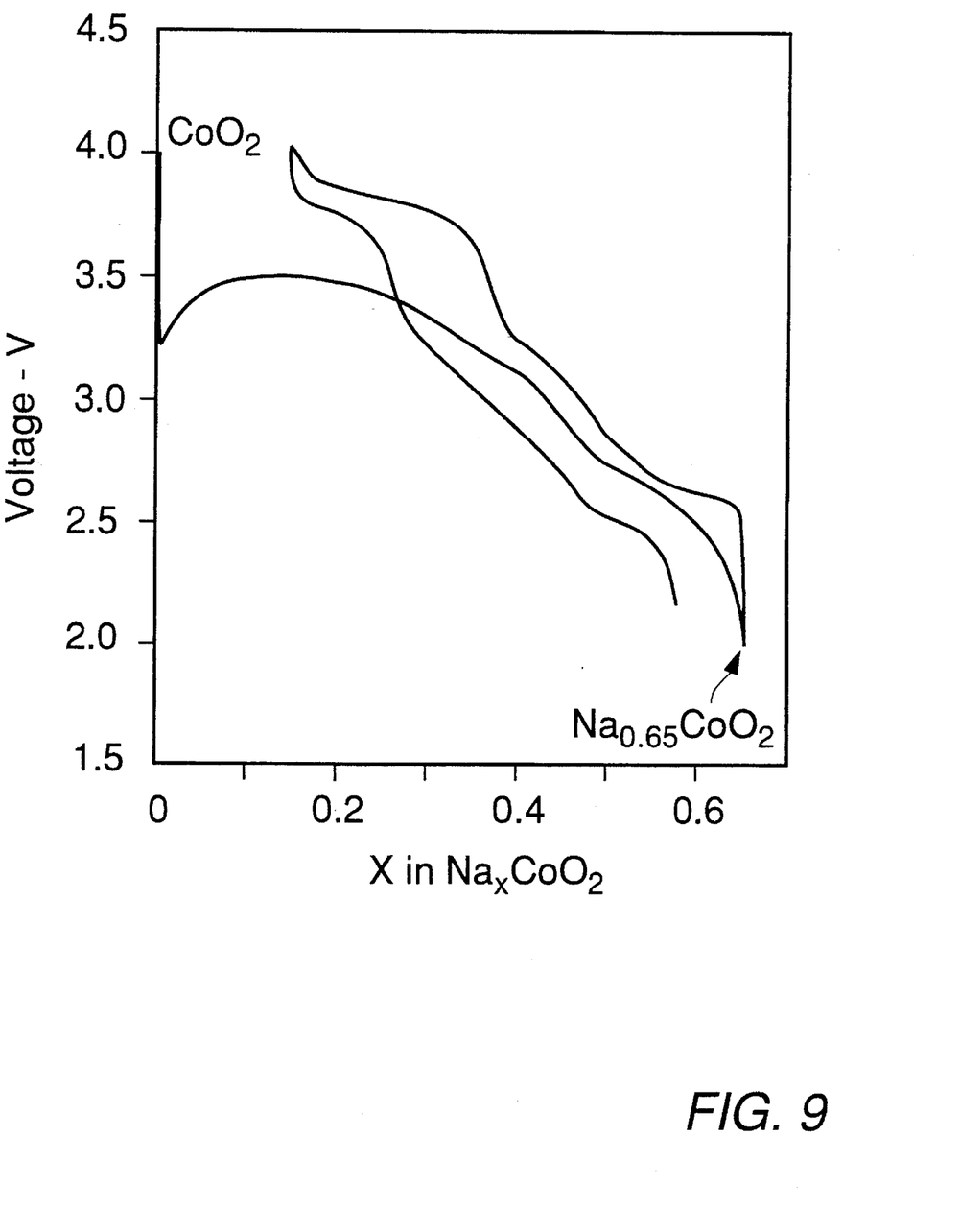
FIG. 9 plots charge and discharge voltages versus sodium content for a cell using the $CoO_2$ phase of this invention intercalated with sodium ions.

The new cell was constructed using the plastic $CoO_2$ cathode, an $NaClO_4$ electrolyte and a sodium metal anode. Sodium was introduced into the $CoO_2$ phase by discharging the cell at 2.2 V to insert the sodium. The cell was then cycled between 2.2 V and 4.1 V, as shown in FIG. 9.

What is claimed is:

1. A method of preparing a stable cobalt dioxide phase comprising:
    a) preparing an electrolytic cell having an anode, an electrolyte inert to oxidation, and a cathode comprising a lithium cobalt oxide intercalation complex; and
    b) applying a voltage in excess of about 5.0 V to deintercalate substantially all lithium from said lithium cobalt oxide intercalation complex.

2. A stable dioxide phase prepared according to the method of claim 1.

3. A stable cobalt dioxide phase prepared according to claim 2 having the x-ray diffraction pattern:

| d(Å) |
| --- |
| 4.30 ± 0.02 |
| 2.44 ± 0.02 |
| 2.12 ± 0.02 |
| 1.61 ± 0.02 |
| 1.41 ± 0.02 |
| 1.34 ± 0.02 |
| 1.17 ± 0.02. |

4. A secondary electrolytic cell including an anode, an electrolyte, and a cathode comprising the cobalt dioxide phase of claim 2.

5. A method according to claim 1 wherein said electrolyte comprises a 0.5M to 2M solution of $LiPF_6$, or $LiPF_6$ with up to about an equal amount of $LiBF_4$ added, in a mixture of dimethylcarbonate (DMC) and ethylene carbonate (EC) within the weight percent ratio range from about 95 DMC:5 EC to 20 DMC:80 EC.

6. A method of preparing a stable nickel dioxide phase comprising:
    a) providing a lithium nickel oxide intercalation complex having the formula $Li_xNiO_2$ wherein x is 0.8 to 1.0;
    b) preparing an electrolytic cell having an anode, an electrolyte inert to oxidation, and a cathode comprising said lithium nickel oxide intercalation complex; and
    c) applying to said cell a voltage in excess of about 5.0 V to deintercalate substantially all lithium from said lithium nickel oxide intercalation complex.

7. A stable nickel dioxide phase prepared according to the method of claim 6.

8. A stable nickel dioxide phase according to claim 7 having the X-ray diffraction pattern:

| d(Å) |
| --- |
| 4.47 ± 0.02 |
| 2.40 ± 0.02 |
| 2.29 ± 0.02 |
| 1.97 ± 0.02 |
| 1.51 ± 0.02 |
| 1.41 ± 0.02 |
| 1.38 ± 0.02. |

9. A secondary electrolytic cell including an anode, an electrolyte, and a cathode comprising the nickel dioxide phase of claim 7.

10. A method according to claim 6 wherein said electrolyte comprises a 0.5M to 2M solution of $LiPF_6$, or $LiPF_6$ with up to about an equal amount of $LiBF_4$ added, in a mixture of dimethylcarbonate (DMC) and ethylene carbonate (EC) within the weight percent ratio range from about 95 DMC:5 EC to 20 DMC:80 EC.

* * * * *